(12) United States Patent
Shirouzu

(10) Patent No.: US 12,228,912 B2
(45) Date of Patent: Feb. 18, 2025

(54) PRODUCTION EQUIPMENT MONITORING SYSTEM AND PRODUCTION EQUIPMENT MONITORING METHOD

(71) Applicant: Panasonic Intellectual Property Management Co., Ltd., Osaka (JP)

(72) Inventor: Hiroshi Shirouzu, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 17/658,674

(22) Filed: Apr. 11, 2022

(65) Prior Publication Data

US 2022/0326684 A1 Oct. 13, 2022

(30) Foreign Application Priority Data

Apr. 13, 2021 (JP) .................. 2021-067967

(51) Int. Cl.
  *G05B 19/418* (2006.01)
  *G06F 18/214* (2023.01)
  *G06Q 50/04* (2012.01)
(52) U.S. Cl.
  CPC ......... *G05B 19/418* (2013.01); *G06F 18/214* (2023.01); *G06Q 50/04* (2013.01)
(58) Field of Classification Search
  CPC ...... G05B 19/4184; G05B 2219/32179; G05B 2219/32191; G06Q 50/04
  See application file for complete search history.

(56) References Cited

U.S. PATENT DOCUMENTS 11,105,948 B2 *  8/2021  Hu ............ G06F 18/23213
2002/0188367 A1  12/2002  Hayashi
(Continued)

FOREIGN PATENT DOCUMENTS

| JP | 2000-114130 A | 4/2000 |
| JP | 2012-099071 A | 5/2012 |
| JP | 2016-061658 A | 4/2016 |

OTHER PUBLICATIONS

Japanese Office Action mailed on Dec. 10, 2024 issued in the corresponding Japanese Patent Application No. 2021-067967.

*Primary Examiner* — Vincent H Tran
(74) *Attorney, Agent, or Firm* — MCDONALD HOPKINS LLC

(57) ABSTRACT

A production equipment monitoring system 20 including: an anomaly index determination unit 23 determining an anomaly index a of a production equipment 10, based on a feature quantity obtained from an equipment information on the production equipment 10; a relevance determination unit 24 determining a degree of relevance D between each of anomalous conditions predicable to occur in the production equipment 10 and an observed condition of the production equipment 10; a detection threshold determination unit 25 determining a single detection threshold th for detecting a degree of anomaly A of the production equipment 10, based on anomaly thresholds at which are thresholds of the anomaly index a corresponding respectively to the anomalous conditions, and on the degree of relevance D; and an anomaly degree detection unit 26 detecting the degree of anomaly A of the production equipment 10, based on the anomaly index a and the detection threshold th.

8 Claims, 3 Drawing Sheets

(56) References Cited

U.S. PATENT DOCUMENTS

| | | | |
|---|---|---|---|
| 2005/0157327 A1* | 7/2005 | Shoji | G06F 11/0751 |
| | | | 358/1.14 |
| 2012/0116827 A1 | 5/2012 | Susumago | |
| 2017/0140287 A1 | 5/2017 | Moriyama et al. | |
| 2018/0309770 A1* | 10/2018 | Han | G06N 20/00 |
| 2018/0372583 A1* | 12/2018 | Tezuka | G05B 23/0221 |
| 2020/0064820 A1* | 2/2020 | Ishiguro | G05B 19/41885 |
| 2020/0387418 A1* | 12/2020 | Suzuki | G06F 11/0751 |
| 2020/0410042 A1* | 12/2020 | Hiroe | G06F 17/16 |
| 2021/0334656 A1* | 10/2021 | Sjøgren | G06N 3/048 |
| 2022/0114437 A1* | 4/2022 | Watt | G06N 3/042 |
| 2022/0155841 A1* | 5/2022 | Pamulaparthy | G05B 23/0205 |
| 2022/0221851 A1* | 7/2022 | Kawai | G05B 23/0272 |
| 2022/0291285 A1* | 9/2022 | Pamulaparthy | G01N 25/72 |

* cited by examiner

PRODUCTION EQUIPMENT MONITORING SYSTEM AND PRODUCTION EQUIPMENT MONITORING METHOD

CROSS REFERENCE TO RELATED APPLICATION

The present application is based on and claims priority under 35 U.S.C. § 119 with respect to the Japanese Patent Application No. 2021-067967 filed on Apr. 13, 2021, of which entire content is incorporated herein by reference into the present application.

TECHNICAL FIELD

The present disclosure relates to a production equipment monitoring system and a production equipment monitoring method.

BACKGROUND

Conventionally, a method for judging an anomaly of a production equipment based on a parameter of the production equipment has been known as disclosed in, for example, Patent Literature 1 (JP2000-114130). According to the method of Patent Literature 1, a plurality of data are sampled with respect to a parameter of a production equipment (specifically, a semiconductor manufacturing apparatus) under normal operation, to construct a Mahalanobis space from a group of sampled data. Then, a Mahalanobis distance is determined from a group of measured values of the parameter of the production equipment in the operation mode, to judge an anomaly of the production equipment, based on the Mahalanobis distance.

SUMMARY

There may be a case, however, where multiple factors are involved in the occurrence of an anomaly in a production equipment. In such a case, according to the known method including the method of Patent Literature 1, it is difficult to conveniently detect an anomaly in the production equipment. Under such circumstances, one of the objectives of the present disclosure is to make it possible to simply and conveniently detect an equipment anomaly attributed to multiple factors.

One aspect of the present disclosure relates to a production equipment monitoring system. The production equipment monitoring system includes: an anomaly index determination unit that determines an anomaly index of a production equipment, based on a feature quantity obtained from an equipment information on the production equipment; a relevance determination unit that determines a degree of relevance between each of a plurality of anomalous conditions predicable to occur in the production equipment and an observed condition of the production equipment; a detection threshold determination unit that determines a single detection threshold for detecting a degree of anomaly of the production equipment, based on a plurality of anomaly thresholds which are thresholds of the anomaly index corresponding respectively to the plurality of anomalous conditions, and on the degree of relevance; and an anomaly degree detection unit that detects the degree of anomaly of the production equipment, based on the anomaly index and the detection threshold.

Another aspect of the present disclosure relates to a production equipment monitoring method. The production equipment monitoring method includes: an anomaly index determination step of determining an anomaly index of a production equipment, based on a feature quantity obtained from an equipment information on the production equipment; a relevance determination step of determining a degree of relevance between each of a plurality of anomalous conditions predicable to occur in the production equipment and an observed condition of the production equipment; a detection threshold determination step of determining a single detection threshold for detecting an anomaly index of the production equipment, based on a plurality of anomaly thresholds which are thresholds of the anomaly index corresponding respectively to the plurality of anomalous conditions, and on the degree of relevance; and an anomaly degree detection step of detecting a degree of anomaly of the production equipment, based on the anomaly index and the detection threshold.

According to the present disclosure, an equipment anomaly attributed to multiple factors can be conveniently detected.

DETAILED DESCRIPTION

Figure 1:
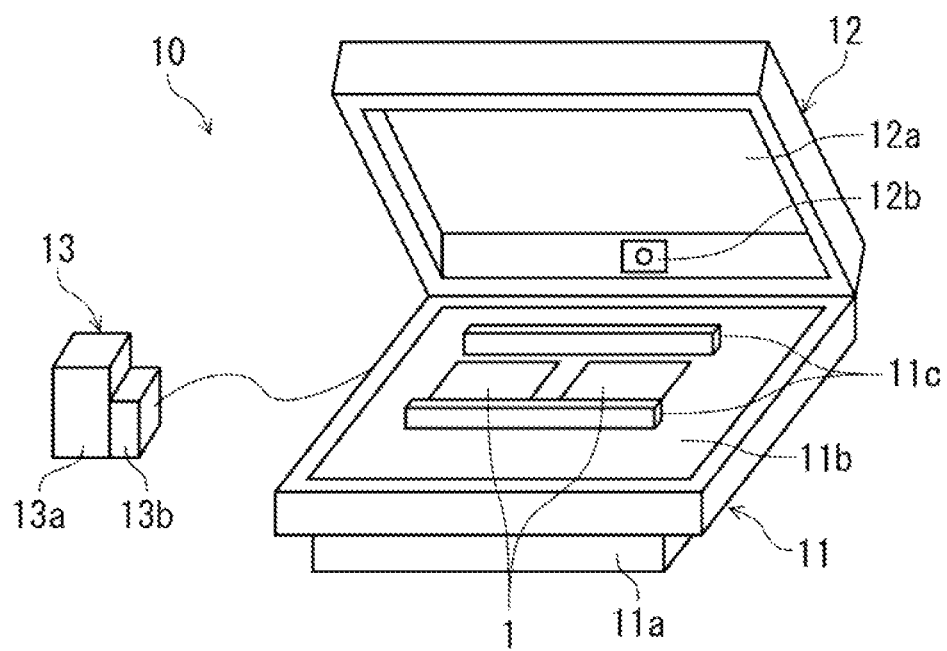
FIG. 1 is a schematic oblique view of a plasma processing apparatus.

Embodiments of a production equipment monitoring system and a production equipment monitoring method according to the present disclosure will be described below by way of examples. It is to be noted, however, that the present disclosure is not limited to the examples described below. In the description below, specific numerical values and materials are exemplified in some cases, but other numerical values and materials may be applied as long as the effects of the present disclosure can be achieved.

(Production Equipment Monitoring System)

The production equipment monitoring system according to the present disclosure includes an anomaly index determination unit, a relevance determination unit, a detection threshold determination unit, and an anomaly degree detection unit.

The anomaly index determination unit determines an anomaly index of the production equipment based on a feature quantity obtained from the equipment information on the production equipment. The production equipment widely refers to various kinds of equipment that produce some articles. The production equipment is, for example, a plasma processing apparatus, such as a plasma cleaner and a plasma dicer. The equipment information may be an information on the control signal used for the control of the production equipment (hereinafter sometimes referred to as a control information), or an information on the signal that a sensor included in the production equipment outputs in correspondence to the control information (hereinafter sometimes referred to as a sensor information). The feature quantity may be obtained, based on such an equipment information, by performing extraction or calculation according to a predetermined rule. The anomaly index is an index that can be used to judge how much the production equipment deviates from the normal condition, from which an anomaly of the production equipment may be detected immediately. In the present disclosure, however, the anomaly index is not used alone to detect an anomaly of the production equipment.

The relevance determination unit determines a degree of relevance between each of a plurality of anomalous conditions predicable to occur in the production equipment and an observed condition of the production equipment. The anomalous condition of the production equipment refers to a condition where an equipment anomaly has occurred due to a certain factor. The observed condition of the production equipment refers to a condition observed in the production equipment under operation. The degree of relevance refers to a degree representing how much one anomalous condition and the observed condition are related to each other, in the production equipment. For example, when the degree of relevance between a certain anomalous condition (here, referred to as an anomalous condition A) and the observed condition is high, the observed condition can be seen as near to the anomalous condition A. Conversely, when the degree of relevance between the anomalous condition A and the observed condition is low, the observed condition can be seen as far from the anomalous condition A.

The detection threshold determination unit determines a single detection threshold for detecting a degree of anomaly of the production equipment, based on a plurality of anomaly thresholds and the degree of relevance. The plurality of anomaly thresholds are thresholds of the anomaly index respectively corresponding to the plurality of anomalous conditions. For example, with a focus on a certain anomaly threshold and an anomalous condition corresponding thereto (here, referred to as an anomalous condition A), when the anomaly index exceeds, for example, 80% of the anomaly threshold, it can be judged that the production equipment is in the anomalous condition A. In the present disclosure, a plurality of such anomaly thresholds are used, and a single detective threshold is determined from the plurality of the anomaly thresholds and the degree of relevance. For example, a single detective threshold can be determined such that among the plurality of the anomaly thresholds, the anomaly threshold whose degree of relevance is relatively high will have a large influence. In this way, in the present disclosure, a single detection threshold is determined with a plurality of anomalous conditions predictable to occur in the production equipment taken comprehensively into consideration.

The anomaly degree detection unit detects a degree of anomaly of the production equipment, based on the anomaly index and the detection threshold. The degree of anomaly of the production equipment refers to a degree representing how much the production equipment as a whole deviates from the normal condition. When the degree of anomaly is too high, the production equipment may fail to operate without maintenance. Therefore, for a person who manages the production equipment, it is important to know the degree of anomaly. In the present disclosure, in addition to the anomaly index, which can be used alone for anomaly detection of the production equipment, the single detection threshold that is determined with a plurality of anomalous conditions predictable to occur in the production equipment taken comprehensively into consideration is used to detect a degree of anomaly of the production equipment. That is, in the present disclosure, an equipment anomaly caused by one or more factors can be detected simply using the anomaly index and the single detection threshold. The person who manages the production equipment can perform a maintenance of the production equipment at an appropriate timing, based on the degree of anomaly or the information on the equipment anomaly which can be detected in such a simple and convenient way. Furthermore, the person who manages the production equipment can also know the information on the degree of relevance, and therefore, when performing the maintenance, can appropriately select a maintenance target, based on the degree of relevance.

The feature quantity may include a first feature quantity and a second feature quantity. The production equipment monitoring system may further include a normal model that simulates the normal condition of the production equipment, with the first feature quantity obtained from the equipment information on the production equipment in the normal condition used as an input, and the second feature quantity obtained from the equipment information on the production equipment in the normal condition used as an output. The anomaly index determination unit determines the anomaly index of the production equipment, based on the second feature quantity that is output from the normal model in response to an input of the first feature quantity of the equipment information observed, and on the second feature quantity of the equipment information observed. According to this configuration, the anomaly index determination unit can determine an anomaly index of the production equipment by utilizing a predetermined normal model. As for the determination method, for example, the anomaly index of the production equipment may be determined such that the higher it is, the greater the difference is between the second feature quantity that is output from the normal model in response to an input of the first feature quantity of the equipment information observed and the second feature quantity of the equipment information observed. As for the first feature quantity, when the production equipment is, for example, a plasma processing apparatus, such as a plasma cleaner or a plasma dicer, it may be, for example, an information on a recipe for executing a process. The recipe can include the control information. In this case, the second feature quantity may be, for example, an information that is output from the production equipment in correspondence to the recipe for process execution, or the sensor information.

When the anomalous condition whose degree of relevance with the observed condition is the highest is referred to as a first anomalous condition, and the anomalous condition whose degree of relevance with the observed condition is the second highest is referred to as a second anomalous condition, the detection threshold determination unit may determine the detection threshold by interpolating between the anomaly threshold of the first anomalous condition and the anomaly threshold of the second anomalous condition, based on a Mahalanobis distance between the first anomalous condition and the observed condition, and on a Mahalanobis distance between the second anomalous condition and the observed condition. According to this configuration, a single detection threshold is determined by taking into account the first anomaly condition and the second anomaly condition, both of which are highly relevant to the observed condition. It is to be noted that many anomaly conditions are predictable to be present in the production equipment, other than the first and second anomaly conditions. However, when an equipment anomaly actually occurs in the production equipment, it suffices in many cases to take into account the top two anomaly conditions, i.e., the first and second anomaly conditions. In this way, by processing the information on the first and second anomaly conditions, rather than totally processing the information on innumerable anomaly conditions, that is, by processing only a necessary and sufficient quantity of information, the anomaly detection in the production equipment can be done more simply and conveniently.

The anomaly degree detection unit may further include a notification unit that notifies the degree of anomaly of the production equipment. The notification unit can notify the degree of anomaly by any method. For example, the notification unit may notify the degree of anomaly by a visual method, for example, by displaying it on a display device. This is not a limitation, and other methods, such as an auditory method and a tactile method, may be used to notify the degree of anomaly. The person who manages the production equipment can appropriately determine the maintenance timing, and the like of the production equipment, based on the notified information on the degree of anomaly.

When notifying the degree of anomaly of the production equipment, the notification unit may notify the anomalous condition whose degree of relevance with the observed condition is the highest. By knowing such an anomaly condition, the person who manages the production equipment can directly know a place which is most in need of maintenance. Therefore, the person who manages the production equipment can easily select a maintenance target.

When notifying the degree of anomaly of the production equipment, the notification unit may also notify the anomalous condition whose degree of relevance with the observed condition is the second highest. By knowing such an anomaly condition, the person who manages the production equipment can directly know a place which is the second most in need of maintenance. Therefore, the person who manages the production equipment can include, as necessary, such a place in the maintenance target.

The production equipment may be a plasma processing apparatus including a processing chamber in which plasma processing is performed, and the degree of anomaly of the production equipment includes a degree of anomaly of at least one element placed in the processing chamber. In such a plasma processing apparatus, for the operation management of the apparatus, it is desired to open the processing chamber as infrequently as possible. According to the present disclosure, the timing when each element requires maintenance can be predicted based on two indices, i.e., the degree of anomaly of the at least one element in the processing chamber and the degree of relevance in the production equipment. Based on the prediction, the person who manages the plasma processing equipment can also perform the maintenance collectively for a plurality of elements in the processing chamber. In this case, as compared to the case, for example, where maintenance is performed every time when an anomaly occurs in each element, the frequency to open the processing chamber can be reduced.

(Production Equipment Monitoring Method)

A production equipment monitoring method according to the present disclosure includes an anomaly index determination step, a relevance determination step, a detection threshold determination step, and an anomaly degree detection step.

In the anomaly index determination step, an anomaly index of the production equipment is determined, based on a feature quantity obtained from an equipment information on a production equipment. The equipment information may be, for example, the sensor information or the control information. The feature quantity may be determined based on such an equipment information, by performing extraction or calculation according to a predetermined rule. An anomaly of the production equipment can be detected immediately from the anomaly index. In the present disclosure, however, the anomaly index is not used alone to detect an anomaly of the production equipment.

In relevance determination step, a degree of relevance between each of a plurality of anomalous conditions predicable to occur in the production equipment and an observed condition of the production equipment. When the degree of relevance between a certain anomalous condition (here, referred to as an anomalous condition A) and the observed condition is high, the observed condition can be seen as near to the anomalous condition A. Conversely, when the degree of relevance between the anomalous condition A and the observed condition is low, the observed condition can be seen as far from the anomalous condition A.

In the detection threshold determination step, a single detection threshold for detecting a degree of anomaly of the production equipment is determined based on a plurality of anomaly thresholds and the degree of relevance. For example, a single detective threshold can be determined such that among the plurality of the anomaly thresholds, the anomaly threshold whose degree of relevance is relatively high will have a large influence. In this way, in the present disclosure, a single detection threshold is determined with a plurality of anomalous conditions predictable to occur in the production equipment taken comprehensively into consideration.

In the anomaly degree detection step, a degree of anomaly of the production equipment is determined based on the anomaly index and the detection threshold. When this degree of anomaly is too high, the production equipment may fail to operate without maintenance. Therefore, for a person who manages the production equipment, it is important to know the degree of anomaly. In the present disclosure, in addition to the anomaly index, which can be used alone for anomaly detection of the production equipment, the single detection threshold that is determined with a plurality of anomalous conditions taken comprehensively into consideration is used to detect a degree of anomaly of the production equipment. That is, in the present disclosure, an equipment anomaly caused by one or more factors can be detected simply using the anomaly index and the single detection threshold. The person who manages the production equipment can perform a maintenance of the production equipment at an appropriate timing, based on the degree of anomaly degree or the information on the equipment anomaly which can be detected in such a simple and convenient way. Furthermore, the person who manages the production equipment can also know the information on the degree of relevance, and therefore, when performing the maintenance, can appropriately select a maintenance target, based on the degree of relevance.

The feature quantity may include a first feature quantity and a second feature quantity. In the anomaly index determination step, a normal model may be used. The normal model may be configured to simulate a normal condition of the production equipment, with the first feature quantity obtained from the equipment information of the production equipment in the normal condition used as an input, and the second feature quantity obtained from the equipment information of the production equipment in the normal condition used as an output. The anomaly index of the production equipment may be determined based on the second feature quantity that is output in response to an input into the normal model of the first feature quantity of the equipment information observed, and on the second feature quantity of the equipment information observed. According to this configuration, in the anomaly index determination step, an anomaly index of the production equipment can be determined utilizing a predetermined normal model. As for the determination method, for example, the anomaly index of the production equipment may be determined such that the higher it is, the greater the difference is between the second feature quantity that is output from the normal model in response to an input of the first feature quantity of the equipment information observed and the second feature quantity of the equipment information observed.

As described above, according to the present disclosure, by using the anomaly index and the single detection threshold, an equipment anomaly attributed to a plurality of factors can be simply and conveniently detected. Furthermore, according to the present disclosure, the person who manages the production equipment can appropriately select an appropriate maintenance timing and a maintenance target, and based thereon, can perform a maintenance of the production equipment.

In the following, examples of the production equipment monitoring system and the production equipment monitoring method according to the present disclosure will be specifically described with reference to the drawings. The components and processes as described above can be applied to the components and processes of the below-described examples of the production equipment monitoring system and the production equipment monitoring method. The components and processes of the below-described examples of the production equipment monitoring system and production equipment monitoring method can be modified based on the description above. The matters as described below may be applied to the above embodiments. Of the components and processes of the below-described examples of the production equipment monitoring system and the production equipment monitoring method, the components and processes which are not essential to the production equipment monitoring system and the production equipment monitoring method according to the present disclosure may be omitted. The figures below are schematic and not intended to accurately reflect the shape and the number of the actual members.

As illustrated in FIG. 1, the production equipment of the present embodiment is a plasma processing apparatus 10 (specifically, a plasma cleaner) including a processing chamber in which plasma processing of a substrate 1 (object to be processed) is performed. The plasma processing apparatus 10 may be a plasma dicer for performing plasma dicing. Also, the production equipment may be a production equipment other than the plasma processing apparatus.

A description of the plasma processing apparatus 10 and a production equipment monitoring system 20 will be given first, which will be followed by a description of a production equipment monitoring method.

(Plasma Processing Apparatus)

The plasma processing apparatus 10 includes a base 11, a lid 12, and a power supply unit 13. In the plasma processing apparatus 10, the processing chamber is defined by the base 11 and the lid 12.

The base 11 has a base body 11a, an electrode body 11b supported on the base body 11a and facing the lid 12, and a guide 11c disposed on the electrode body 11b. The base body 11a is a rectangular frame-like member, and electrically insulated from the electrode body 11b. In generating plasma in the processing chamber, the electrode body 11b functions as one electrode. The guide 11c is composed of at least a pair of rail-like members extending in a predetermined direction (the left and right directions in FIG. 1). The guide 11c guides the substrate 1 along the predetermined direction. The guide 11c is one example of the element disposed in the processing chamber.

The lid 12 is a box-type lid having a ceiling portion and a sidewall extending from the periphery of the ceiling portion. The lid 12 is openable and closable by an opening and closing mechanism (not shown). The sidewall of the lid 12 is in close contact with the peripheral portion of the base body 11a when the lid 12 is closed. Thus, the processing chamber is formed as an internal space defined by the lid 12 and the base 11. When the lid 12 is opened, the processing chamber is thrown open. An irradiation part 12a for irradiating plasma is formed on the lid 12 at its lower surface of the ceiling portion. In generating plasma in the processing chamber, the irradiation part 12a functions as the other electrode. The lid 12 is further provided at its inner surface of the sidewall with a plasma monitor 12b for detecting a light intensity during plasma generation. The irradiation part 12a and the plasma monitor 12b are each an example of the element disposed in the processing chamber.

The power supply unit 13 has a high-frequency power source 13a and an automatic matcher 13b. The high-frequency power source 13a is electrically connected to the electrode body 11b of the base 11. The high-frequency power source 13a applies a high-frequency power across the electrode body 11b and the lid 12, in a state where the process gas is present in the processing chamber. This generates plasma in the processing chamber. The automatic matcher 13b has a function to prevent the interference due to the high-frequency reflected wave that flows between the electrode body 11b and the lid 12.

Although not shown, the plasma processing apparatus 10 further includes a control unit and various sensors. The control unit controls the opening and closing of the lid 12, the operation of the power supply unit 13, and the supply operation of a process gas to the processing chamber. The control unit includes a CPU and a storage device in which a program executable by the CPU is stored. The various sensors detect various conditions of the plasma processing apparatus 10. Examples of the sensors include a sensor for detecting a gas pressure in the processing chamber, and a sensor for detecting an output signal of the plasma monitor 12b. An information on the signal of the control unit (control information), and an information on the signal of the various sensors (sensor information) are utilized by the production equipment monitoring system 20, as described herein later.

(Production Equipment Monitoring System)

Figure 2:
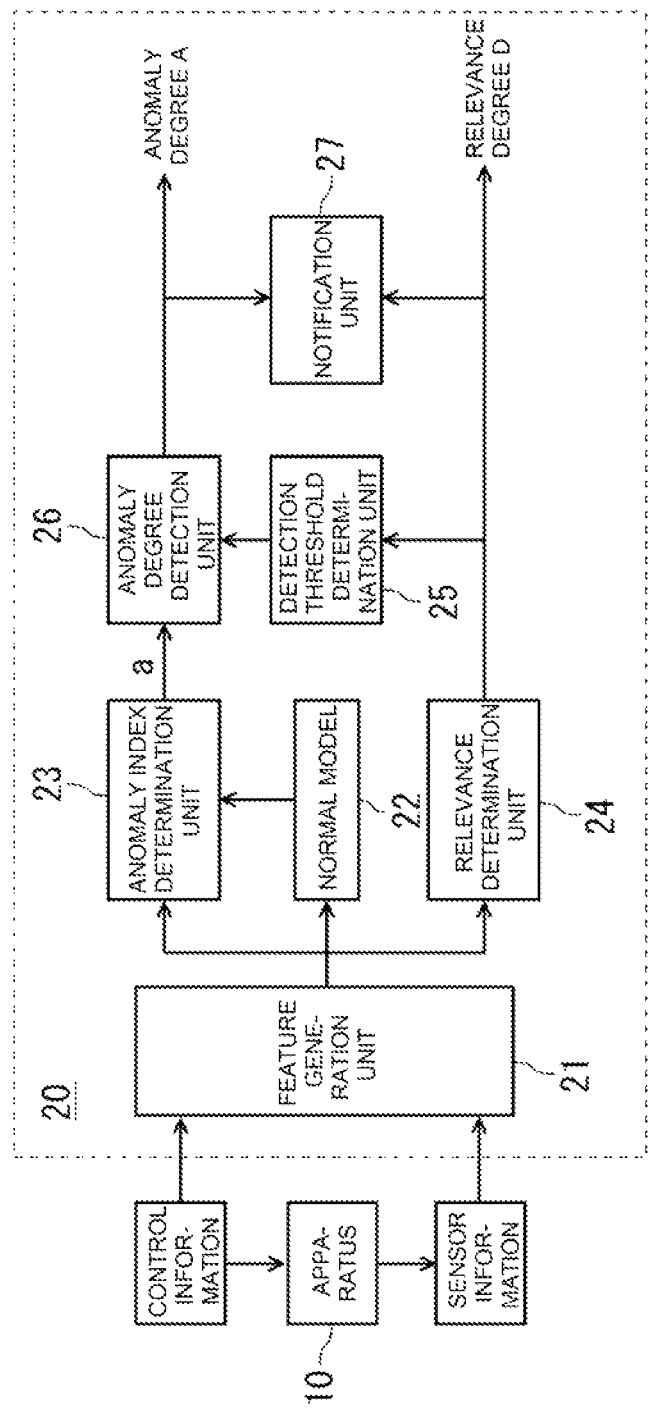
FIG. 2 is a functional block diagram of a production equipment monitoring system.

As illustrated in FIG. 2, the production equipment monitoring system 20 is a system for monitoring the plasma processing apparatus 10. The production equipment monitoring system 20 is composed of a computer communicatively connected to the plasma processing apparatus 10. The production equipment monitoring system 20 includes a feature generation unit 21, a normal model 22, an anomaly index determination unit 23, a relevance determination unit 24, a detection threshold determination unit 25, an anomaly degree detection unit 26, and a notification unit 27.

The feature generation unit 21 generates a first feature quantity and a second feature quantity, based on the control information acquired from the control unit of the plasma processing apparatus 10, and the sensor information acquired from the various sensors of the plasma processing apparatus 10. Various methods can be adopted for generating the first feature quantity and the second feature quantity from the control information and the sensor information. For example, a predetermined information may be extracted from the control information or the sensor information, which may be used as each feature quantity, or alternatively or in addition, various calculations may be performed with respect to the information extracted from the control information or the sensor information, to generate each feature quantity.

The normal model 22 is a learned model that simulates the normal condition of the plasma processing apparatus 10. The normal model 22 may be formed by, for example, setting a multiple regression distribution model, with the first feature quantity of the plasma processing apparatus 10 in the normal condition used as an input, and the second feature quantity of the plasma processing apparatus 10 in the normal condition used as an output, and then, learning the convergent point of the multiple regression distribution model by machine learning. The normal model 22, in response to an input of the first feature quantity of the equipment information (control information or sensor information) observed while the plasma processing apparatus 10 is in operation, outputs the second feature quantity corresponding thereto.

The anomaly index determination unit 23 determines an anomaly index a of the plasma processing apparatus 10 based on the second feature quantity output from the normal model 22 as described above, and the second feature quantity of the equipment information observed while the plasma processing apparatus 10 is in operation. For example, the anomaly index determination unit 23 may determine a single anomaly index a from the following formula (1). In the formula (1), x' is the feature quantity (second feature quantity) of the observed value, $\hat{\mu}$ is the mean of each feature quantity (each second feature quantity), and $\hat{\sigma}$ is the square root of the dispersion of the feature quantity (second feature quantity).

[Math formula 1]

$$a = \left(\frac{x' - \hat{\mu}}{\hat{\sigma}}\right)^2 \quad (1)$$

The relevance determination unit 24 determines a degree of relevance D between each of a plurality of anomalous conditions predictable to occur in the plasma processing apparatus 10 and the observed condition of the plasma processing apparatus 10. The anomalous conditions include, for example, a condition in which the irradiation part 12*a* is dirty, a condition in which the gap between the base 11 and the cover 12 is dirty, a condition in which the plasma monitor 12*b* is dirty, and a condition in which the power supply unit 13 is malfunctioned. The relevance determination unit 24 may determine the degree of relevance D by, for example, determining a Mahalanobis distance between the second feature quantity of the equipment information observed and the data distribution of each anomalous condition, to calculate the inverse of the Mahalanobis distance, and then, normalizing the obtained inverses. Here, the data distribution of each anomalous condition may be created, for example, by causing an anomalous condition to occur intentionally in the plasma processing apparatus 10 and on the basis of the feature quantity of the equipment information acquired in that condition. For example, on the basis of the feature quantity of the equipment information acquired in a condition in which dirt is adhered (or a condition in which a member imitating dirt is attached) to the irradiation part 12*a*, the data distribution corresponding to an anomalous condition in which the irradiation part 12*a* is dirty can be created.

The detection threshold determination unit 25 determines a single detection threshold th for detecting a degree of anomaly A of the plasma processing apparatus 10, based on a plurality of anomaly thresholds at and the degree of relevance D. The anomaly thresholds at are thresholds of the anomaly index a corresponding respectively to the anomalous conditions. For example, the anomaly threshold at of the irradiation part 12*a* is a threshold of the anomaly index a corresponding to the anomalous condition of the irradiation part 12*a*. The plurality of anomaly thresholds are usually at different levels. For example, there may be a case where the anomaly threshold at corresponding to the anomalous condition of the irradiation part 12*a* is 100, while the anomaly threshold at corresponding to the anomalous condition of the plasma monitor 12*b* is 50. In this case, the anomaly of the plasma processing apparatus 10 as the whole cannot be appropriately determined even though the anomaly index a is simply compared with each anomaly threshold at. For example, it is given that the anomaly index a is obtained as 50, based on the numerical values exemplified in this paragraph. This value reaches 50, which is the anomaly threshold at of the plasma monitor 12*b*, but is far below 100, which is the anomaly threshold at of the irradiation unit 12*a*. In such a case, it cannot be determined whether the anomaly index a of 50 should be seen as problematic or not in the plasma processing apparatus 10 as a whole.

On the other hand, the detection threshold determination unit 25 determines a single detection threshold th, as mentioned above. In the present embodiment, the anomalous condition the degree of relevance D of which with the observed condition of the plasma processing apparatus 10 is the highest is referred to as a first anomalous condition, and the anomalous condition the degree of relevance D of which with the above observed condition is the second highest is referred to as a second anomalous condition. The detection threshold determination unit 25 determines a single detection threshold th by interpolating between the anomaly threshold at of the first anomalous condition and the anomaly threshold at of the second anomalous condition, based on a Mahalanobis distance between the first anomalous condition and the observed condition, and on a Mahalanobis distance between the second anomalous condition and the observed condition.

For example, the anomalous condition of the irradiation part 12*a* (anomaly threshold at =100) is referred to as the first anomalous condition, and the anomalous condition of the plasma monitor 12*b* (anomaly threshold at =50) is referred to as the second anomalous condition. Also, a Mahalanobis distance between the observed condition of the plasma processing apparatus 10 and the first anomalous condition is given as 1, and a Mahalanobis distance between the observed condition and the second anomalous condition is given as 4. In this case, a linear interpolation between the anomaly threshold at of the first anomalous condition and the anomaly threshold at of the second anomalous condition gives 90 as the single detection threshold. This value can be determined by solving the equation, (100−th):(th−50)=1:4. It is noted, however, that the interpolation is not limited to a linear interpolation, and any function can be used to make interpolation.

The anomaly degree detection unit 26 detects a degree of anomaly A of the plasma processing apparatus 10, based on the anomaly index a and the detection threshold th. For example, the anomaly degree detection unit 26 may detect the degree of anomaly A as the ratio of the anomaly index a to the detection threshold th (A=a/th). Specifically, for example, given that the anomaly index a is 50 and the detection threshold th is 90, the degree of anomaly A is calculated as approximately 0.56 (=50/90). In this way, according to the production equipment monitoring system 20 of the present embodiment, the degree of anomaly A of the plasma processing apparatus 10 as a whole can be simply and conveniently detected, based on the comparison of one anomaly index a with one detection threshold th.

The notification unit 27 notifies the degree of anomaly A of the plasma processing apparatus 10. The notification unit 27 of the present embodiment is a display device of a computer, but not limited thereto. For example, the notification unit 27 may notify the degree of anomaly A by displaying a value of the degree of anomaly A on the display device. Also, when notifying the degree of anomaly A, the notification unit 27 notifies the anomalous condition the degree of relevance D of which with the observed condition of the plasma processing apparatus 10 is the highest (the first anomalous condition), and the anomalous condition the degree of relevance D of which is the second highest (the second anomalous condition). That is, the notification unit 27 of the present embodiment notifies not only the degree of anomaly A of the plasma processing apparatus 10 as the whole, but also two factors that highly contribute to the degree of anomaly A. Therefore, the person who manages the plasma processing apparatus 10 can make an appropriately determination, before failures occur, on the maintenance timing and the maintenance target of the plasma processing apparatus 10.

(Production Equipment Monitoring Method)

A description will be given below of a production equipment monitoring method of the present embodiment. The production equipment monitoring method may be performed in the above-described equipment monitoring system 20, and may be performed in a system having a configuration other than this.

Figure 3:
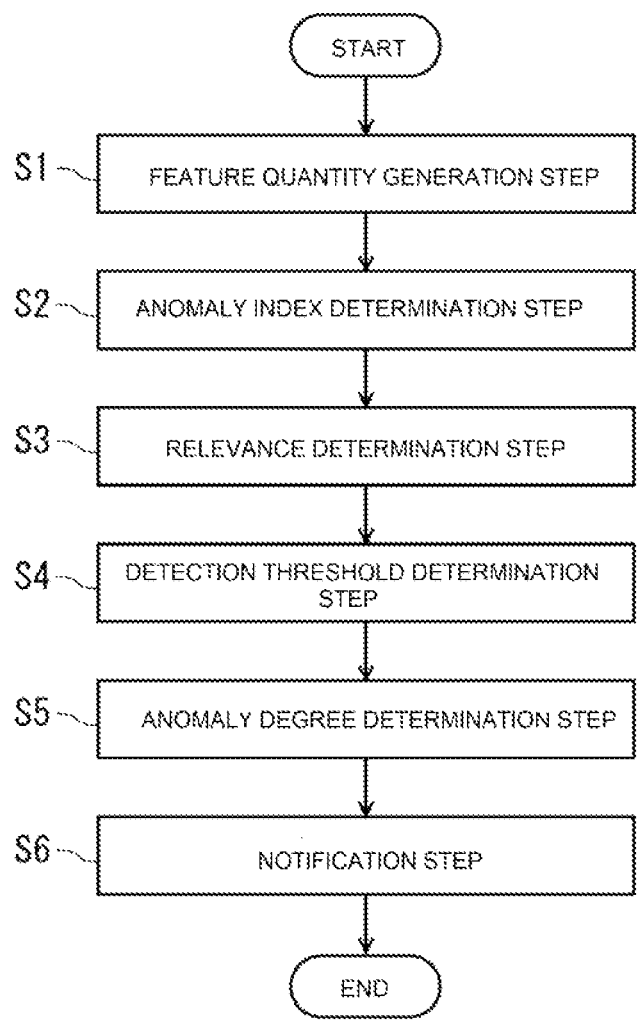
FIG. 3 is a flowchart of a production equipment monitoring method.

As illustrated in FIG. 3, the production equipment monitoring method includes a feature quantity generation step S1, an anomaly index determination step S2, a relevance determination step S3, a detection threshold determination step S4, an anomaly degree determination step S5, and a notification step S6.

In the feature quantity generation step S1, the first feature quantity and the second feature quantity are generated based on the control information acquired from the control unit of the plasma processing apparatus 10 and the sensor information acquired from the various sensors of the plasma processing apparatus 10. Various methods can be adopted for determining the first feature quantity and the second feature quantity from the control information and the sensor information. For example, a predetermined information may be extracted from the control information and the sensor information, which may be used as each feature quantity, or alternatively or in addition, various calculations may be performed with respect to the information extracted from the control information or the sensor information, to generate each feature quantity.

In the anomaly index determination step S2, an anomaly index a of the plasma processing apparatus 10 is determined based on the second feature quantity that is output in response to an input into the normal model 22 of the first feature quantity of the equipment information observed while the plasma processing apparatus 10 is in operation, and on the second feature quantity of the equipment information observed. For example, in the anomaly index determination step S2, the anomaly index a may be determined from the above-mentioned formula (1).

In the relevance determination step S3, a degree of relevance D between each of a plurality of anomalous conditions predictable to occur in the plasma processing apparatus 10 and the observed condition of the plasma processing apparatus 10 is determined. The relevance determination unit 24 may determine the degree of relevance D by, for example, determining a Mahalanobis distance between the second feature quantity of the equipment information observed and the data distribution of each anomalous condition, to calculate the inverse of the Mahalanobis distance, and then, normalizing the obtained inverses.

In the detection threshold determination step S4, a single detection threshold th for detecting a degree of anomaly A of the plasma processing apparatus 10, based on a plurality of the anomaly thresholds at and the degree of relevance D. In the present embodiment, the anomalous condition the degree of relevance D of which with the observed condition of the plasma processing apparatus 10 is the highest is referred to as a first anomalous condition, and the anomalous condition the degree of relevance D of which with the above observed condition is the second highest is referred to as a second anomalous condition. The single detection threshold th is determined by interpolating between the anomaly threshold at of the first anomalous condition and the anomaly threshold at of the second anomalous condition, based on a Mahalanobis distance between the first anomalous condition and the observed condition, and on a Mahalanobis distance between the second anomalous condition and the observed condition.

In the anomaly degree determination step S5, a degree of anomaly A of the plasma processing apparatus 10 is detected, based on the anomaly index a and the detection threshold th. For example, the anomaly degree detection unit 26 may detect the degree of anomaly A as the ratio of the anomaly index a to the detection threshold th (A=a/th). Specifically, for example, given that the anomaly index a is 50 and the detection threshold th is 90, the degree of anomaly A is calculated as approximately 0.56 (=50/90). In this way, according to the production equipment monitoring method of the present embodiment, the degree of anomaly A of the plasma processing apparatus 10 as a whole can be simply and conveniently detected, based on the comparison of one anomaly index a with one detection threshold th.

In the notification step S6, the degree of anomaly A of the plasma processing apparatus 10 is notified. In the notification step S6, for example, the degree of anomaly A may be notified by displaying a value of the degree of anomaly A on the display device. Also, when notifying the degree of anomaly A, the notification unit 27 notifies the anomalous condition the degree of relevance D of which with an observed condition of the plasma processing apparatus 10 is the highest (the first anomalous condition), and the anomalous condition the degree of relevance D of which is the second highest (the second anomalous condition). That is, in the notification step S6 of the present embodiment, not only the degree of anomaly A of the plasma processing apparatus 10 as the whole, but also two factors that highly contribute to the degree of anomaly A are notified. Therefore, the person who manages the plasma processing apparatus 10 can make an appropriately determination, before failures occur, on the maintenance timing and the maintenance target of the plasma processing apparatus 10.

The present disclosure is available for a production equipment monitoring system and a production equipment monitoring method.

REFERENCE NUMERALS

1: substrate
10: plasma processing apparatus (production equipment)
   11: base
      11a: base body
      11b: electrode body
      11c: guide (element)
   12: lid
      12a: irradiation part (element)
      12b: plasma monitor (element)
   13: power supply unit
      13a: high-frequency power source
      13b: automatic matcher
20: production equipment monitoring system
   21: feature generation unit
   22: normal model
   23: anomaly index determination unit
   24: relevance determination unit
   25: detection threshold determination unit
   26: anomaly degree detection unit
   27: notification unit
a: anomaly index
at: anomaly threshold
A: degree of anomaly
D: degree of relevance
th: detection threshold

What is claimed is:

1. A production equipment monitoring system, comprising:
   a computer configured to:
   determines an anomaly index of a production equipment, based on a feature quantity obtained from an equipment information on the production equipment;
   determines a degree of relevance between each of a plurality of anomalous conditions predicable to occur in the production equipment and an observed condition of the production equipment;
   determines a single detection threshold for detecting a degree of anomaly of the production equipment, based on a plurality of anomaly thresholds which are thresholds of the anomaly index corresponding respectively to the plurality of anomalous conditions, and on the degree of relevance;
   detects the degree of anomaly of the production equipment, based on the anomaly index and the detection threshold; and
   notify a degree of anomaly of the production equipment, wherein
   when the anomalous condition whose degree of relevance with the observed condition is the highest is referred to as a first anomalous condition, and the anomalous condition whose degree of relevance with the observed condition is the second highest is referred to as a second anomalous condition,
   the computer is configured to determine the detection threshold by interpolating between the anomaly threshold of the first anomalous condition and the anomaly threshold of the second anomalous condition, based on a Mahalanobis distance between the first anomalous condition and the observed condition, and on a Mahalanobis distance between the second anomalous condition and the observed condition, and
   the computer is configured to notify the degree of anomaly of the production equipment so as to support a person who manages the production equipment to make a determination, before failures occur, on the maintenance timing and the maintenance target of the production equipment.

2. The production equipment monitoring system according to claim 1, wherein
   the feature quantity includes a first feature quantity and a second feature quantity,
   the production equipment monitoring system further includes a normal model that simulates a normal condition of the production equipment, with the first feature quantity obtained from the equipment information on the production equipment in the normal condition used as an input, and the second feature quantity obtained from the equipment information on the production equipment in the normal condition used as an output,
   the computer is configured to determines the anomaly index of the production equipment, based on the second feature quantity that is output from the normal model in response to an input of the first feature quantity of the equipment information observed, and on the second feature quantity of the equipment information observed.

3. The production equipment monitoring system according to claim 1, wherein in notifying the degree of anomaly of the production equipment, the computer notifies the anomalous condition whose degree of relevance with the observed condition is the highest.

4. The production equipment monitoring system according to claim 3, wherein in notifying the degree of anomaly of the production equipment, the notification unit the computer notifies also the anomalous condition whose degree of relevance with the observed condition is the second highest.

5. The production equipment monitoring system according to claim 1, wherein
   the production equipment is a plasma processing apparatus including a processing chamber in which plasma processing is performed, and
   the degree of anomaly of the production equipment includes a degree of anomaly of an element placed in the processing chamber.

6. A production equipment monitoring method, comprising:
   an anomaly index determination step of determining an anomaly index of a production equipment, based on a feature quantity obtained from an equipment information on the production equipment;
   a relevance determination step of determining a degree of relevance between each of a plurality of anomalous conditions predicable to occur in the production equipment and an observed condition of the production equipment;
   a detection threshold determination step of determining a single detection threshold for detecting an anomaly index of the production equipment, based on a plurality of anomaly thresholds which are thresholds of the anomaly index corresponding respectively to the plurality of anomalous conditions, and on the degree of relevance;
   an anomaly degree detection step of detecting a degree of anomaly of the production equipment, based on the anomaly index and the detection threshold; and
   a notification step of notifying the degree of anomaly of the production equipment, wherein
   when the anomalous condition whose degree of relevance with the observed condition is the highest is referred to as a first anomalous condition, and the anomalous condition whose degree of relevance with the observed condition is the second highest is referred to as a second anomalous condition, in the detection threshold determination step, the detection threshold is determined by interpolating between the anomaly threshold of the first anomalous condition and the anomaly threshold of the second anomalous condition, based on a Mahalanobis distance between the first anomalous condition and the observed condition, and on a Mahalanobis distance between the second anomalous condition and the observed condition, and in the notification step, the degree of anomaly of the production equipment is notified so as to support a person who manages the production equipment to make a determination, before failures occur, on the maintenance timing and the maintenance target of the production equipment.

7. The production equipment monitoring method according to claim 6, wherein
the feature quantity includes a first feature quantity and a second feature quantity, and in the anomaly index determination step, a normal model is used, the normal model being configured to simulate a normal condition of the production equipment, with the first feature quantity obtained from the equipment information of the production equipment in the normal condition used as an input, and the second feature quantity obtained from the equipment information of the production equipment in the normal condition used as an output, and the anomaly index of the production equipment is determined based on the second feature quantity that is output in response to an input into the normal model of the first feature quantity of the equipment information observed, and on the second feature quantity of the equipment information observed.

8. The production equipment monitoring method according to claim 6, wherein
the production equipment is a plasma processing apparatus including a processing chamber in which plasma processing is performed, and the degree of anomaly of the production equipment includes a degree of anomaly of an element placed in the processing chamber.

\* \* \* \* \*